United States Patent
Smith

(10) Patent No.: US 8,188,850 B2
(45) Date of Patent: May 29, 2012

(54) SYSTEM FOR ENHANCING PERCEPTION OF A MOTOR VEHICLE'S MARK EMBLEM

(75) Inventor: Jefferson Smith, Wilmington, NC (US)

(73) Assignee: Jepp Industries, Inc., Wilmington, NC (US)

( * ) Notice: Subject to any disclaimer, the term of this patent is extended or adjusted under 35 U.S.C. 154(b) by 301 days.

(21) Appl. No.: 12/466,815

(22) Filed: May 15, 2009

(65) Prior Publication Data
US 2010/0289636 A1    Nov. 18, 2010

(51) Int. Cl.
*B60Q 1/54* (2006.01)

(52) U.S. Cl. ............ 340/466; 340/384.3; 340/425.5; 340/691.2; 362/496

(58) Field of Classification Search .......... 340/466, 340/468, 425.5, 384.3, 691.2; 362/487, 496; 428/31
See application file for complete search history.

(56) References Cited

U.S. PATENT DOCUMENTS

| | | | | |
|---|---|---|---|---|
| 3,909,780 A * | 9/1975 | Huffman | .......... | 340/463 |
| 4,796,002 A * | 1/1989 | Heidman, Jr. | .......... | 340/428 |
| 4,807,101 A * | 2/1989 | Milde, Jr. | .......... | 340/472 |
| 4,891,252 A * | 1/1990 | Kaiser, Jr. | .......... | 428/31 |
| 4,994,785 A * | 2/1991 | Perlman et al. | .......... | 340/426.29 |
| 5,052,714 A * | 10/1991 | Muscat et al. | .......... | 428/31 |
| 5,144,281 A * | 9/1992 | Peterson | .......... | 340/426.29 |
| 5,166,662 A * | 11/1992 | Santagato | .......... | 340/426.29 |
| 5,267,318 A * | 11/1993 | Severson et al. | .......... | 340/384.3 |
| 5,278,556 A * | 1/1994 | Oh | .......... | 340/988 |
| 5,585,151 A * | 12/1996 | Bruning | .......... | 428/31 |
| 5,779,345 A * | 7/1998 | Adams | .......... | 362/496 |
| 5,828,319 A * | 10/1998 | Tonkin et al. | .......... | 340/466 |
| 6,981,789 B2 * | 1/2006 | Assinder et al. | .......... | 362/494 |
| 7,397,349 B2 * | 7/2008 | Lahr et al. | .......... | 340/463 |
| 2003/0197606 A1 * | 10/2003 | Epstein | .......... | 340/466 |

FOREIGN PATENT DOCUMENTS

| | | |
|---|---|---|
| KR | 10-0804408 B1 | 2/2008 |
| KR | 10-2009-0019115 A | 2/2009 |

* cited by examiner

*Primary Examiner* — Thomas Mullen
(74) *Attorney, Agent, or Firm* — Ward and Smith, P.A.

(57) ABSTRACT

A system is provided for causing audible sounds, and/or visible actions, and/or motion to occur by a vehicle's mark emblem. The system may cause such actions to be initiated manually or automatically as a result of vehicle operation or operator action. Controls are provided to prevent the audible sound, visible action, or motion to occur if the vehicle speed is above a legal speed limit. Such may be controls set by the vehicle operator. In addition, when operated from a position remote from the vehicle, the audible sound associated with the mark emblem will be limited to a volume that will prevent persons from becoming startled when they are in proximity to the vehicle.

9 Claims, 3 Drawing Sheets

SYSTEM FOR ENHANCING PERCEPTION OF A MOTOR VEHICLE'S MARK EMBLEM

FIELD OF THE INVENTION

This invention relates to a system for drawing attention to a vehicle and a mark emblem on a vehicle for allowing the driver to associate more closely with the brand and goodwill associated with the vehicle. By the term "vehicle" is meant all types of vehicles and can include and is not limited to, personal cars, personal trucks, recreational vehicles, motorcycles, hobby vehicles and other like vehicles.

BACKGROUND OF THE INVENTION

Mark emblems have been closely associated with motor vehicles since their inception. More specifically, mark emblems are often indicators of an individual's status depending on the specific mark emblem and the vehicle upon which the mark emblem is attached. More particularly, mark emblems serve as trademarks representative of the quality of the vehicle, as well as the goodwill associated therewith. As a result, depending on the mark emblem, there is often a positive effect associated with the mark emblem, and mark emblems contribute to the sale of such vehicles.

In the past, various systems have been developed to attempt to customize an owner's experience with their vehicle. One such system includes a vehicle remote control locking and unlocking device which is more intricate than a horn or beep tone. Such systems provide sounds that are unique and can be used to help an owner locate their motor vehicle, but which can also be personalized to reflect various aspects of importance to the owner. One example of such a system, of which there are numerous such systems, includes the ability to customize the sounds to be something of importance and relates to the owner's lifestyle, for example, a deer call, golf related sounds, etc.

Another prior system allows a user to customize the sound being emitted by a remote control locking/unlocking mechanism so that an operator can choose from a plurality of pre-recorded sound cards, which will help in distinguishing their own vehicle from others in the area.

One common feature of most of these prior art devices and systems is that many are used to assist an owner to locate and identify their vehicle from among a plurality of other vehicles. Typically the sound volume is high and the operator will follow the sound until the vehicle is viewed. One problem with such a system however, is that there may be persons in close proximity to the vehicle and such loud sounds can scare or startle such persons. In the case of car horns, the sound emitted is particularly high in volume, intentionally so because of the main function of the horn as an alert mechanism when driving in traffic.

These problems of the prior art remote signaling devices are overcome by the present invention in which a system is provided directed primarily to enhancing the driver's experience in relation to the mark emblem of the driver's particular vehicle. The problems of startling or scaring persons in proximity to the vehicle are also avoided in accordance with the system described herein.

For purposes of the disclosure made herein, it is noted that by the term "mark emblem" is meant the unique emblem on a particular make of motor vehicle that functions as a trademark such as, for example, the mustang on a Ford Mustang motor vehicle. A motor vehicle as will be readily apparent to those of ordinary skill in the art can include an automobile or any other vehicle driven by a motor or engine, including but not limited to sport utility vehicles and other like vehicles.

SUMMARY OF THE INVENTION

In accordance with one aspect of the invention, there is provided a system for enhancing perception of a motor vehicle's mark emblem. The system for a motor vehicle emits audible sounds related to the vehicle's mark emblem, and/or performs a visible action(s) of the vehicle's mark emblem, and/or causes motion(s) of the vehicle's mark emblem. Such a system is activated manually or automatically by the vehicle operator.

In one specific aspect, manual switches are provided for causing the mark emblem to one or more move, and/or emit a sound, and/or create a visible action, such as emitting a specific light pattern, spraying liquid, and like actions. Such manual activation is performed when the motor vehicle operator actuates the one or more switches.

Automatic actuation occurs when the motor vehicle operator performs a normal vehicle action that triggers the system, such as putting the transmission into drive gear.

A speed sensor may be provided for detecting whether a vehicle on which the system is mounted is moving at or below a legal speed limit.

A controller is associated with the system. The speed sensor, if necessary, will send a signal to the controller for permitting the mark emblem to move, and/or emit a sound, and/or make a visible action only upon the vehicle moving at or below a legal speed limit.

By the term "legal speeds" or "legal speed limit" is meant any government speed limit that applies to the sound, visible action, and/or motion related to the system of the invention. For example, there may be a law in Wilmington, N.C. that would prohibit the sound produced by the invention at speeds above 7 mph. The maximum legal vehicle speed limit would most likely be a speed greater than 7 mph.

A sound volume limiting device may also be provided for limiting the volume of sound emitted by the mark emblem to avoid the aforedescribed startling action to those in proximity to the vehicle. An automatic switch may also be provided for causing the mark emblem to move, and/or generate a sound, and/or make a visible action upon the vehicle door being opened, the vehicle being started, the vehicle being shut off, or the transmission being placed in gear. While actions such as opening the vehicle door, starting the vehicle, shutting off the vehicle, placing the transmission in gear have been described, this list is not all exhaustive and other like actions can trigger the automatic switch or switches.

Optionally, the audible sound(s) visible action(s), and/or motion(s) of the vehicle's mark emblem can be adjusted by the vehicle operator. The system will not be used for signaling to assist the motor vehicle operator in finding the vehicle. The system avoids health hazards by limiting sound pressure output (dB) of the device when installed to be activated from a position remote from the motor vehicle. The sound pressure output will be limited to a value that will make the system not useful as an audible signaling device or vehicle locating device.

BRIEF DESCRIPTION OF THE DRAWINGS

Having briefly described the invention, the same will become better understood from the appended drawing in which.

DETAILED DESCRIPTION OF THE INVENTION

Figure 1:
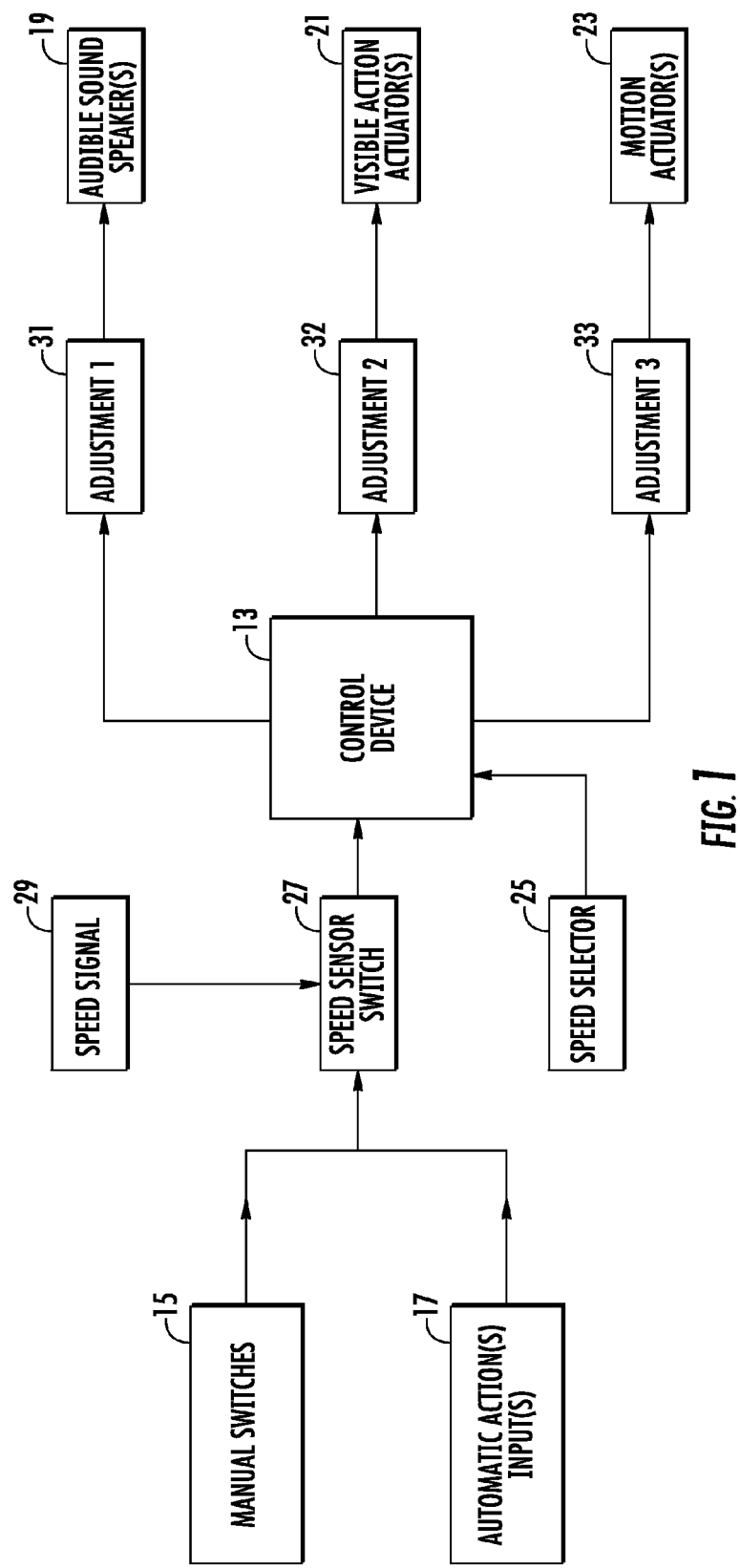
FIG. 1 is a block diagram showing the general system of the invention to be associated on a vehicle, and with the vehicle, and with a mark emblem mounted on the vehicle.

The system 11 of the invention is illustrated in block diagram in FIG. 1. At the center of the system 11 is a control device 13 which provides a number of different functions as described hereinafter, and the form of which can take numerous forms as will be readily apparent to those of ordinary skill in the art. Associated with the mark emblem on a vehicle are audible sound speakers 19, and/or a visible action actuator 21, such as for example, a light source or other light visible action actuator and/or a motion actuator 23, such as a small reciprocating motor, for example, to cause a mark emblem such as the mustang on a Ford Mustang vehicle to move.

The control device 13 may be actuated through one or more manual switches 15 or through one or more automatic actuators 17, such as an automatic actuator associated with a door of the vehicle, the ignition switch, the transmission shifter, etc., so as to cause the control device 13 to cause one or more of the three different actions with the mark emblem to occur. Either the manual switches 15 or the automatic action causing device 17 may be used to cause one or more of the types of actions selected by the user, i.e., visible actions, sounds, and/or motions associated with the mark emblem to occur. A manual switch 15 in one instance can be a key fob with a receiver mounted in the car.

A sound selector 25 may be associated with the control device 13 to provide signals representative of one or more of a plurality of different sounds associated with the mark emblem, and the selection of the sound can be made by the user either at the sound selector, through the manual switches, or automatic actuator device 17, or combination of such devices.

As will also be readily appreciated, a speed sensor switch 27 can be provided associated with a speed detecting unit 29 which detects the speed of motion of the vehicle and causes the speed switch 27 to switch off operation of the audible sound, and/or visible action, and/or motion upon the speed of the vehicle exceeding a legal speed. By legal speeds is meant that which has been previously defined herein.

With respect to the operation of the speakers, action actuator or motion actuator, adjustment units 31 can be provided to control and adjust the sound volume and/or visible action and/or motion associated with the mark emblem.

Figure 2A:
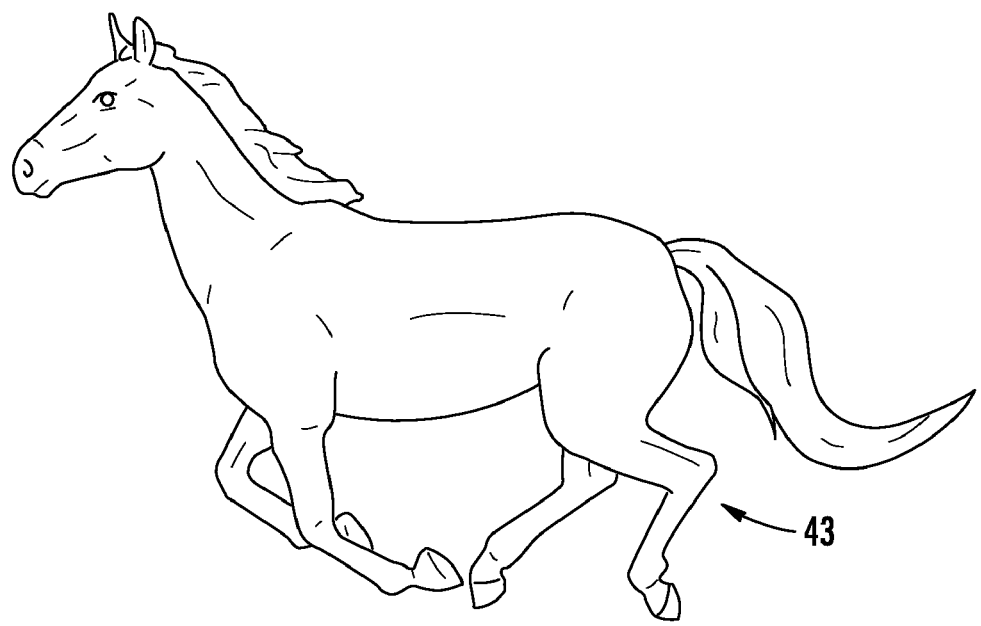
FIGS. 2a and 2b illustrate a Ford Mustang mark emblem in first and second positions resulting from rotation by the system of the invention.
Figure 2B:
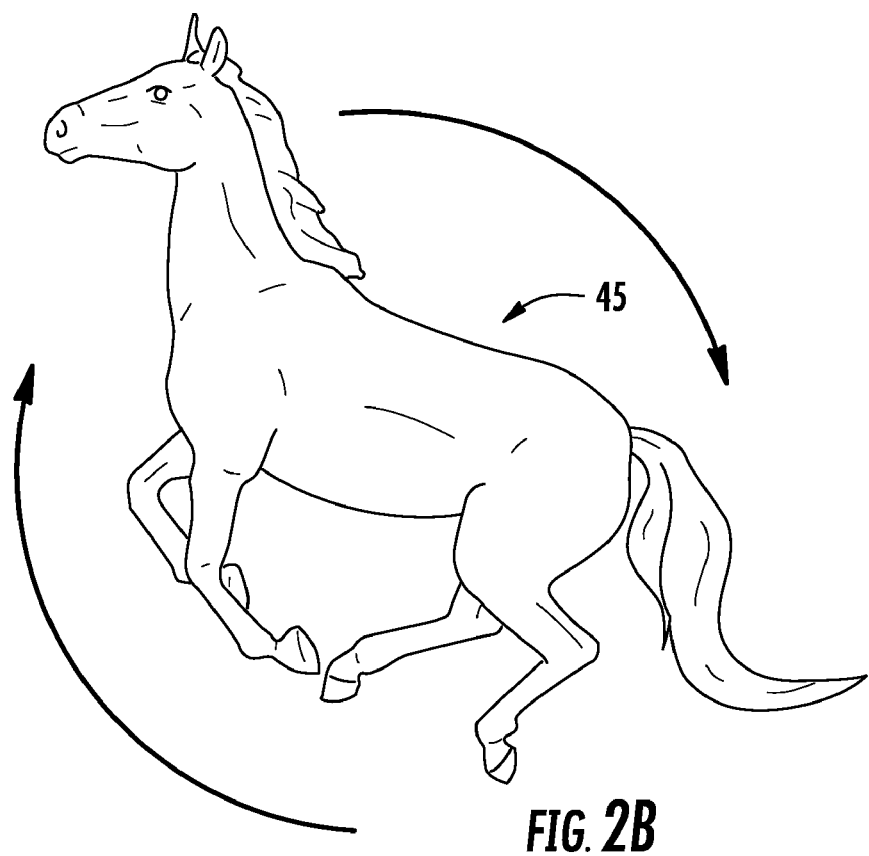
Figure 3A:
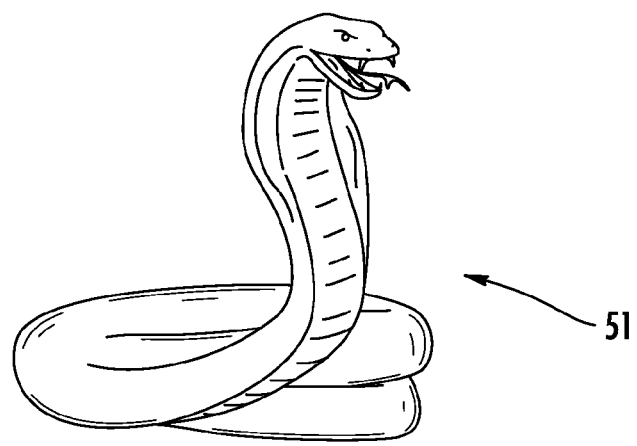
FIGS. 3a, 3b and 3c illustrate an alternative embodiment of a mark emblem as a Ford Cobra emblem actuated according to the invention.
Figure 3B:
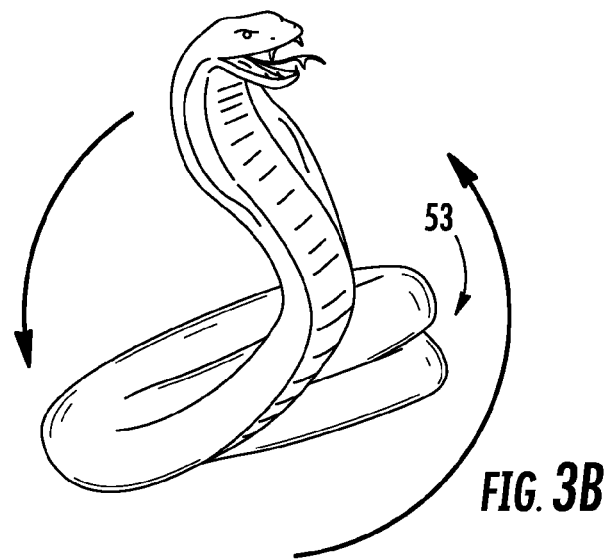
Figure 3C:
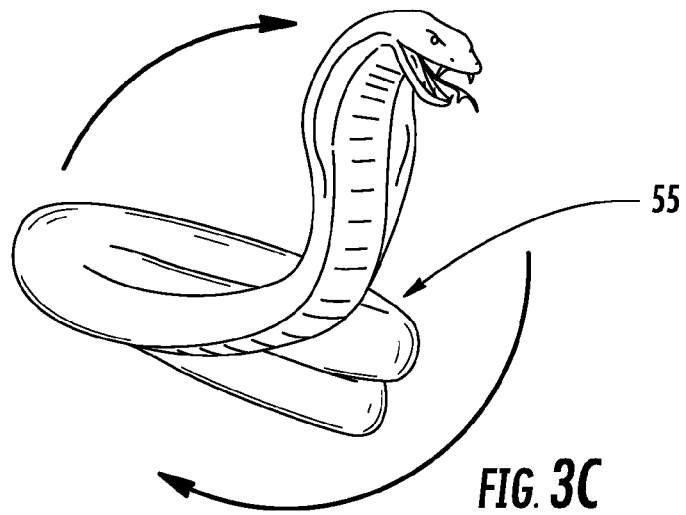

FIGS. 2a and 2b illustrate a specific example of the invention in relation to FIG. 1. In operation, if the owner of a Ford Mustang vehicle has the system of the invention installed on the owner's vehicle so that when the owner actuates a toggle switch (FIG. 1, 15) at speeds below 7 mph, the control device (FIG. 1, 13) sends a signal to an electric motor (FIG. 1, 23) that causes the Mustang mark emblem 43 on the front grill of the car to rotate in a clockwise direction. An electric motor (FIG. 1, 23) rotates the Mustang mark emblem to the position represented by mustang 45 in FIG. 2. After the Mustang mark emblem is in the position, the control device (FIG. 1, 13) sends a signal to the audible sound speakers (FIG. 1, 19) so that they emit the sound of a horse whinny. After the horse whinny sound is completed, the control device (FIG. 1, 13) sends a signal to the electrical motor (FIG. 1, 23) that causes the Mustang mark emblem to rotate in a counterclockwise direction back to its original position 43. By way of example, in the town where the owner lives, the law states that 7 mph is the maximum speed at which this system 11 can be operated. Therefore, the owner adjusts the speed sensor switch (FIG. 1, 27) to deactivate the system 11 when the car is driven above 7 mph. After using the system 11 for six months, the owner decides to reduce the sound by using the adjustment knob (FIG. 1, 31), and decides to speed up the rotation of the mark emblem by using another adjustment knob (FIG. 1, 31).

A second specific example of the invention is illustrated by relating FIG. 1 to FIGS. 3a, 3b and 3c. As an example, the owner of Ford Cobra vehicle has a device installed on his vehicle so that after the owner starts the vehicle, an automatic action input (FIG. 1, 17) sends a signal to the control device (FIG. 1, 13), which sends a signal to an electric motor (FIG. 1, 23) that causes the Cobra mark emblem 51 on the front grill of the car to rotate back and forth. The electric motor (FIG. 1, 23) rotates the Cobra mark emblem back and forth between the positions represented by the figures in FIG. 3 marked 53 and 55. While the Cobra mark emblem is rotating between the positions 53 and 55, the control device (FIG. 1, 13) continues to send a signal to the audible sound speakers (FIG. 1, 19) so that they emit the sound of a snake hiss. After the Cobra mark emblem rotates between 53 and 55 positions two times, the control device (FIG. 1, 13) sends a signal to the electric motor (FIG. 1, 23) that causes the Cobra mark emblem to rotate back to its original position. The owner also has a manual toggle switch (FIG. 1, 15) on the inside of the vehicle that when actuated, causes a visible action actuator (FIG. 1, 21) to expel a squirt of water from the mouth of the Cobra mark emblem. Such squirting is illustrative of a visible action which is separate and distinct from motion. Accordingly, visible action is any action by the mark emblem, such as lights, extraneous to the visible features of the mark emblem and/or any sound associated therewith. By way of further example, in the town where the owner lives, the law states that 10 mph is the maximum speed at which this system 11 can be operated. Therefore, the owner adjusts the speed sensor switch (FIG. 1, 27) to deactivate the device when the car is driven above 10 mph. After using the device for eight months, the owner decides to increase the sound by using the adjustment knob (FIG. 1, 31). The owner also decides to produce a stronger squirt of water by using another adjustment knob (FIG. 1, 31).

Having thus generally described the invention, the same will become better understood from the appended claims in which it is set forth in a nonlimiting manner hereafter.

What is claimed is:

1. A system for enhancing perception of a motor vehicle's mark emblem, comprising: at least one mark emblem mounted on the exterior of a motor vehicle; and a motion actuator for causing the at least one mark emblem to move, and/or a sound source for emitting a sound related to the at least one mark emblem, and/or means for causing a visible action, other than motion, of the at least one mark emblem; and a speed sensor and speed sensor switch for detecting whether a vehicle on which the system is mounted is moving at or below a legal speed limit.

2. The system of claim 1, further comprising a manual switch to trigger at least one of said motion actuator, sound source, and means for causing visible action to cause said mark emblem to move, emit a sound, and/or create the visible action, other than motion.

3. The system of claim 2, wherein said manual switch may comprise a plurality of switches.

4. The system of claim 1, further comprising a sound volume limiting device for limiting the volume level of the sound source.

5. The system of claim 4, further comprising at least one adjustment circuit for adjusting the sound volume, visible action, and/or a motion of the mark emblem.

6. The system of claim 1, further comprising means for storing and selecting at least one of a plurality of different sounds representative of the mark emblem.

7. The system of claim 1, further comprising an automatic switch or switches to trigger at least one of said motion actuator, sound source, and means for causing visible action to cause said mark emblem to at least one of move, generate a sound, and make a visible action, other than motion.

8. The system of claim 1, further comprising a remote control system comprised of a transmitter and a signal receiver, to trigger said motion actuator, sound source, and/or means for causing visible action from a location remote from the motor vehicle, and a sound limiting device for limiting the volume of the sound source.

9. A system for enhancing perception of a motor vehicle's mark emblem, comprising: at least one mark emblem mounted on a motor vehicle; a motion actuator for causing the at least one mark emblem to move, and/or a sound source for emitting sound related to the at least one mark emblem, and/or means for causing a visible action, other than motion, of the at least one mark emblem; a speed sensor and speed sensor switch for detecting whether a vehicle on which the system is mounted is moving at or below a legal speed limit; and a controller to control at least one of the motion actuator, sound source, and means for causing visible action to cause said at least one mark emblem to at least one of move, emit a sound, and make a visible action, other than motion, only when the vehicle is moving at or below the legal speed limit.

* * * * *